(12) United States Patent
Trugenberger

(10) Patent No.: US 9,268,990 B2
(45) Date of Patent: Feb. 23, 2016

(54) APPARATUS AND METHOD FOR PRODUCING AN IDENTIFICATION DEVICE

(76) Inventor: Carlo Trugenberger, Cologny (SE)

(*) Notice: Subject to any disclaimer, the term of this patent is extended or adjusted under 35 U.S.C. 154(b) by 533 days.

(21) Appl. No.: 13/634,781

(22) PCT Filed: Mar. 16, 2010

(86) PCT No.: PCT/EP2010/053380
§ 371 (c)(1),
(2), (4) Date: Sep. 13, 2012

(87) PCT Pub. No.: WO2011/113478
PCT Pub. Date: Sep. 22, 2011

(65) Prior Publication Data
US 2013/0004033 A1 Jan. 3, 2013

(51) Int. Cl.
*G06N 3/02* (2006.01)
*G06K 9/00* (2006.01)
*G06F 21/32* (2013.01)
*G07C 9/00* (2006.01)

(52) U.S. Cl.
CPC ............ *G06K 9/00073* (2013.01); *G06F 21/32* (2013.01); *G06K 9/00087* (2013.01); *G06N 3/02* (2013.01); *G07C 9/00087* (2013.01); *G07C 2209/12* (2013.01)

(58) Field of Classification Search
None
See application file for complete search history.

(56) References Cited

U.S. PATENT DOCUMENTS 5,418,886 A * 5/1995 Oita et al. ................. 706/25
6,219,639 B1 * 4/2001 Bakis et al. ............... 704/246
6,668,072 B1 12/2003 Hribernig et al.
2005/0175223 A1 * 8/2005 Nordin ..................... 382/124
2006/0240867 A1 * 10/2006 Wang et al. .............. 455/556.1

FOREIGN PATENT DOCUMENTS

EP 1076878 B1 2/2001
WO WO-0014716 A1 3/2000
(Continued)

OTHER PUBLICATIONS

"Hopfield Networks", http://www.comp.leeds.ac.uk/ai23/reading, Lecture slides.*
(Continued)

*Primary Examiner* — Ben Rifkin
*Assistant Examiner* — Mai T Tran
(74) *Attorney, Agent, or Firm* — Harness, Dickey & Pierce, P.L.C.

(57) ABSTRACT

An authentication system authenticates an object. The authentication system includes a capture device for capturing at least one biometric output data record (BD) for the object; a reading device for reading configuration data (Konf), associated with the object, for an artificial neural network; a processing device designed to produce the artificial neural network and to input the BD into the neural network; a verification device which captures an output from the neural network to authenticate the object, wherein the neural network is a bidirectional associative memory, particularly a Hopfield network, having a multiplicity of network states. The verification device is designed to determine the output from the neural network by capturing a final state derived from the input of the BD. The neural network stores a key associated with a particular person. The key is released only when appropriate biometric data are input into the neural network.

8 Claims, 4 Drawing Sheets

(56) References Cited

FOREIGN PATENT DOCUMENTS

WO    WO-0074001 A1    12/2000
WO    WO-2005064547 A1    7/2005

OTHER PUBLICATIONS

English Translation of the Written Opinion of the International Searching Authority; International Application No. PCT/EP2010/053380; Int'l Filing Date: Mar. 16, 2010, with attached Transmittal and International Preliminary Report on Patentability (10 pages).

U. Uludag et al., "Fuzzy Vault for Fingerprints", 2005, Audio-And-Video-Based Biometric Person Authentication; Lecture Notes in Computer Science; XP019013285, ISBN: 978-3-54027887-0.

U. Uluday and A. Jain, "Fuzzy Fingerprint Vault", Proceedings of the Workshop "Biometrics: Challenges Arising from Theory and Practice".

P. Mihailescu, "The Fuzzy Vault for Fingerprints is Vulnerable to Brute Force Attack" eprint arXiv: 0708.2974.

International Search Report (in German with English translation) for PCT/EP2010/053380, mailed Dec. 16, 2010; ISA/EP.

\* cited by examiner

Data Structure

APPARATUS AND METHOD FOR PRODUCING AN IDENTIFICATION DEVICE

CROSS-REFERENCE TO RELATED APPLICATIONS

This application is a 371 U.S. National Stage of International Application No. PCT/EP2010/053380, filed on Mar. 16, 2010. The disclosure of which is herein incorporated by reference in its entirety.

BACKGROUND OF THE INVENTION

The present disclosure relates to an authentication system, a method for authenticating an object, an apparatus for producing an identification device and a method for producing an identification device.

Biometric recognition methods have undergone an enormous upturn in recent years. Technological progress increasingly allows the rapid measurement of biological characteristics and the evaluation thereof with a feasible level of complexity. The use of biometrics is a promising approach to solving the problem of many security concepts. This gives rise to the issue of how identities and the associated rights can be linked to the correct physical object (e.g. a person). In the globalized information society, the solution to this problem is of central importance. By way of example, biometric data (e.g. a fingerprint from a person) can be stored on the identity card of said person in order to ensure that the holder of the identity card is also the owner thereof. Biometric measurements or scans allow forgeries and misappropriations of an identity card to be recognized. Biometric characteristics are frequently distinguished into active/passive, behavior-based, physiologically based or dynamic/static. Behavior-based characteristics which are stable in the long term include the voice, handwriting or signature, keystroke dynamics and gait dynamics. Physiological characteristics which are stable in the long term are the fingerprint, the iris or hand geometry, for example. Biometric characteristics used for authorizing an object are, inter alia: body size, iris, retina, fingerprint, face geometry, hand vessel structure, hand geometry, hand line structure, nail bed pattern, voice, signature, keystroke dynamics, lip movement, gait, body odor and DNA.

A biometric recognition system for authorizing a person is known from WO 00/74001 A1. In this case, biometric data are stored on an identification device, for example an ID card or identity card. In order to authenticate the person and hence to establish the authorization of said person, the person presents his identification device. The biometric data stored thereon are captured by a comparison device and are compared with the relevant biometric characteristics of the person. By way of example, an iris scan can be used to produce what is known as a live template with appropriate reference data and to compare it with stored biometric data, what are known as comparison data. The person is granted a particular authorization only if the geometric characteristics of the person match the stored biometric data. A drawback of the method described in WO 00/74001 A1 is that the memory on the identification device is not conclusively protected against forgery. In theory, it is possible to corrupt the data such that a third party can authenticate himself using these data. Stolen data result in the identity being compromised. The method can be used only for authentication and cannot be used for storing a key.

Furthermore, for reasons pertaining to data protection law, the biometric data can be neither duplicated nor buffer-stored in different countries. One reason for this is that various biometric data can be used to derive information about people that underlies their privacy (for example illnesses). From security-related aspects too, there is a desire to avoid the storage of complete biometric data, since these are a security risk. In theory, biometric characteristics which are required for authorization can be reconstructed and forged, which means that security locks can be bypassed, e.g. using a false fingerprint. WO 2005/064547 A1 discloses the practice of encrypting biometric comparison data and splitting them over a plurality of devices, e.g. a server and an identification device in the form of a chip card.

Different methods are known for linking biometric data or templates from a user or object to a (digital) key (e.g. a number which identifies the object). Usually, a distinction is drawn here between the following three methods:

a method which releases keys (key release);
a method which binds keys (key binding);
a method which generates keys (key generation).

In the case of the methods which release keys, the biometric authentication is completely decoupled from the key release. The biometric comparison data and the key are both stored in a central database, but with each being a separate entry. The key is released only when the biometric output data obtained (live template) match the stored template or the stored templates (comparison data). This method has the drawback that the stored biometric templates can be irrevocably stolen. Furthermore, it is possible to overwrite the stored biometric data or templates and hence to make the associated key accessible to another person.

In the case of the method which binds keys, the key and the biometric template form a unit, with the key being able to be generated only when appropriate biometric data are available. A cryptobiometric comparison algorithm is used in order to perform the authentication and at the same time to release the key. Hence, access to the key without the biometric data can be gained only with difficulty.

In the case of the method which generates keys, neither the key nor the template is stored in any form. The key is obtained directly from the biometric data from the object during the authentication process.

The last two cited methods can be implemented only with great difficulty. A known implementation of a key binding method is known from Uludag and Jain (cf. U. Uludag and A. Jain, "Fuzzy Vault for Fingerprints", Proceedings of the Workshop "Biometrics: Challenges Arising from Theory and Practice", pp. 13-16, Cambridge UK, 2004). Allegedly, however, one of these methods are very susceptible to brute force attacks (cf. P. Mihailescu, "The Fuzzy Vault for Fingerprints is Vulnerable to Brute Force Attacks" eprint arXiv: 0708.2974.).

As regards the key release method, it is known practice to use neural networks in order to obtain a reliable comparison between the stored and the obtained biometric data (cf. EP 1 076 878 B1). Using the network as an actual storage location for the key is novel.

BRIEF SUMMARY OF THE INVENTION

Against the background of this prior art, it is an object of the present invention to provide a secure and reliable authentication system. In particular, it is an aim to disclose an authentication system which ensures a high level of data protection and allows secure and simple authentication and authorization of an object.

Furthermore, it is an aim to specify a method for authenticating an object, an apparatus for producing an identification device and a method for producing an identification device.

This object is achieved by an authentication system, a method for authenticating an object, an apparatus for producing an identification device and a method for producing an identification device.

In particular, the object is achieved by an authentication system for authenticating an object, wherein the authentication system comprises:

a capture device for capturing at least one biometric output data record for the object;

a reading device for reading configuration data, associated with the object, for an artificial neural network;

a processing device which is designed to produce the artificial neural network and to input the biometric output data record into the neural network;

a verification device which captures an output from the neural network in order to authenticate the object, wherein the neural network is a bidirectional associative memory, particularly a Hopfield network, having a multiplicity of network states and the verification device is designed to determine the output from the neural network by capturing a final state derived from the input of the biometric output data record.

An essential item in the present invention is thus to provide an authentication system which resorts to a key binding method, wherein the method uses a neural network in order to bind the key. Preferably, this neural network is a bidirectional associative memory which has a multiplicity of states, receives the biometric output data record and uses it to calculate a final state which indicates an output (e.g. a key). A bidirectional associative memory is a class of artificial neural networks and can be regarded as a generalized Hopfield network. Bidirectional associative memories belong to the group of feedback artificial neural networks. Bidirectional associative memories have a link between each neuron in the network. Therefore, even in the case of small networks, the computation complexity for reconstructing biometric data stored therein is extremely high. Hence, information, once stored in the neural network, cannot be restored with reasonable complexity, which means that the biometric data are secure from unauthorized access. Furthermore, the neural networks proposed have the advantage that they perform inherent error correction, which means that variations for obtaining the biometric output data nevertheless result in secure authentication.

Preferably, Hopfield networks are used, which have only one layer of neurons which acts as input layer and output layer simultaneously. Each of the preferably binary McCulloch-Pitts neurons is linked to every one apart from itself. The neurons can assume the values −1 and 1 ($s_i(t)=-1$ or $s_i(t)=1$), which correspond to the states "does not fire" and "fires". In Hopfield networks, the synaptical weights are symmetrical, i.e. it is true for all neurons that the synaptic weight $w_{i,j}$ between the i-th and j-th neurons is the same as the synaptic weight $w_{j,i}$ between the j-th and i-th neurons.

The verification device may be designed to capture a key encoded by means of the final state of the bidirectional associative memory for the purpose of authenticating the object. It would be possible to also use a bidirectional associative memory to implement a key releasing authentication method. Preferably, however, a key binding method is provided, which means that both the biometric data and the key data are protected against unauthorized access.

The bidirectional associative memory may have an allocated energy function for determining the energy in the individual network states, wherein the final state has an associated at least local minimum and the processing device is designed to instantiate the bidirectional associative memory to input the output data into the network and to ascertain the final state. Preferably, the following energy function is used in order to rate the network states of the bidirectional associative memory in terms of energy:

$$E(t)=-\tfrac{1}{2}\Sigma_{i\neq j}w_{i,j}s_i(t)s_j(t)$$

The processing of the biometric output data within the bidirectional associative memory may thus correspond to an optimization method in which a local minimum is sought.

The processing device may be designed to ascertain the final state in an iterative method, wherein each iteration step involves at least one neuron in the bidirectional associative memory being randomly selected and the value of the neuron being recalculated in order to take account of this value in the subsequent iteration step. This is thus an asynchronous change in the network. When n-binary neurons are used with the neuron value $s_i(t)$ (i is an arbitrary value from 1 to n and t indicates the t-th iteration step), the next neuron value $s_i(t+1)$ for a randomly selected neuron can be calculated as follows:

$$s_i(t+1) = \begin{cases} +1 & \text{if } \sum_{i\neq j} w_{i,j}s_j(t) > 0 \\ -1 & \text{else} \end{cases}$$

The capture device may comprise a segmentation device in order to split biometric image data from the object into a multiplicity of segments and to determine the at least one biometric output data record by establishing in each of the segments whether a particular feature is present. According to the invention, the image data from the object (e.g. a grid graphic for a fingerprint) can thus be captured. These image data can be split into a multiplicity of segments, with it being established in each of the segments whether a particular characteristic feature (e.g. minutiae) is present. The biometric output data record may thus be a vector which comprises a multiplicity of binary entries which indicate whether the relevant feature is present in a particular segment or sector. This splitting of the image data makes it possible to compensate for differences which arise when biometric data are received repeatedly. The method is particularly advantageous when the aim is to recognize fingerprints for which minutiae and the position thereof relative to one another within a fingerprint are usually determined. Discrepancies on account of the finger being repositioned on the finger scanner or on account of the elastic surface of the finger can be compensated for by said method. This reduces the false rejection rate.

The capture device may be a fingerprint scanner.

The capture device may comprise a correction device which converts a captured biometric output data record into the biometric output data record that is input into the associative memory such that the input biometric output data record is as similar as possible to a corresponding training data record for which the neural network has been trained. The correction device reduces the false rejection rate further and makes the system more robust.

The correction device can convert the captured biometric output data record into the input biometric output data record by inputting a multiplicity of permutations of the captured biometric output data record into a further bidirectional associative memory, particularly an associative memory produced on the basis of configuration data. The associative memory for deriving the final state and the further associative memory for the correction device can be instantiated by using the same configuration data. The two associative memories may be identical.

The correction device can implement a random state change for the associative memory in order to ascertain an optimum output data record for deriving the final state. In order to prevent continuation at a coordinate local minimum, methods such as simulated annealing or similar methods can be implemented by the correction device.

The capture device may comprise an image capture device for capturing an image, particularly a fingerprint, and the correction device can choose the permutations such that they correspond to translations and rotations of the image. It can easily be appreciated that the correction device can also take account of other restrictions when choosing the permutations.

The reading device may comprise an RFID reader and/or a card reading device and/or a device for capturing the data on a mobile telephone. The configuration data required for the authentication system can be stored either directly on an appliance associated with the object or centrally (e.g. in a database system). In the latter case, the object has an identification number which allows the configuration data to be requested from the central database system. By way of example, such an identification number can be stored on a mobile telephone, a smartcard or a similar apparatus. On the other hand, it is also possible to use said apparatuses in order, as already mentioned, to store the necessary configuration data directly.

The aforementioned object is likewise achieved by a method for authenticating an object, wherein the method comprises the following steps:
a) capture of at least one biometric output data record for the object;
b) reading of configuration data, associated with the object, from an identification device;
c) initiation of an artificial neural network on the basis of the configuration data by a processing device;
d) input of the at least one biometric output data record into the neural network;
e) determination of an output from the artificial neural network in order to authenticate the object,
wherein
step c) comprises:
c1) initiation of a bidirectional associative memory, particularly a Hopfield network, having a multiplicity of network states on the basis of the configuration data; and step d) comprises:
d1) stipulation of a starting state for the bidirectional associative memory on the basis of the biometric output data record;
d2) iteration over a multiplicity of network states in order to find a final state which has an associated local minimum by virtue of an energy function.

In the present application, the identification device needs to be understood to mean any device which is suitable for providing configuration data for authenticating an object. These include the chip cards, mobile telephones and databases already cited previously. The identification device may thus be an appliance that is individually associated with the object or else a central device, such as the authentication system outlined above. It is essential to the present invention that the identification device provides configuration data which allow an artificial neural network, namely a bidirectional associative memory, to be instantiated in order to use it to verify the identity of the object.

Step e) may comprise derivation of a key by using the final state of the bidirectional associative memory. By way of example, the final state can encode the key.

Step d2) may comprise random selection of at least one neuron in the bidirectional associative memory in each iteration step and calculation of a neuron value for the selected neuron in order to use this neuron value in the subsequent iteration step, particularly when calculating the neuron value for the next selected neuron. Even if it were possible to make synchronous changes (i.e. one iteration step involves all neurons being updated simultaneously), an asynchronous change is preferable. This iteration method allows rapid optimization of the bidirectional associative memory in terms of the energy function thereof to be attained, which means that the method converges quickly.

The aforementioned object is furthermore achieved by an apparatus for producing an identification device, wherein the apparatus comprises:
a capture device for capturing at least one biometric output data record having a multiplicity of output data elements for an object;
a production device for producing an artificial neural network;
an encoding device for producing at least one training data record from the at least one biometric output data record;
a training device which trains the artificial neural network such that the latter recognizes the at least one training data record;
a memory device for storing configuration data which describe the trained artificial neural network in the identification device,
wherein the artificial neural network is a bidirectional associative memory, particularly a Hopfield network, having a multiplicity of states, wherein the associative memory has an allocated energy function for determining the energy in the individual states, the training device trains the associative memory such that a final state associated with the training data record has an energy which is an at least local minimum.

In order to operate the aforementioned authentication system and to carry out an appropriate authentication method, it is necessary to have an identification device which provides the configuration data for the neural network. According to the invention, in order to provide these configuration data, a bidirectional associative memory is trained using at least one training data record or biometric output data record such that said bidirectional associative memory recognizes the biometric characteristics that are indicated by the biometric output data record. When a bidirectional associative memory is used, one particular advantage is that variations of the biometric output data or of the biometric output data record can also be associated with the object or with the original biometric output data record used for training the bidirectional associative memory. The bidirectional associative memory is thus error tolerant to a certain degree and can compensate for natural discrepancies. The final state, which is reached when the biometric output data record or a slightly varied biometric output data record is input correctly, can be used to capture the training data record. This training data record may contain a key for authenticating the object or may be the key itself. Preferably, the production device will, for this purpose, choose the artificial neural network such, and the training device will train the artificial neural network such, that the artificial neural network outputs a key for the purpose of authenticating the object when recognizing the biometric output data record.

For this, a random element generator device for producing the key having a number of random elements can be provided, wherein the number of random elements is smaller than the number of output data elements, wherein the encoding device produces the training data record by replacing a portion of the biometric output data record with the random elements or combining the output data elements with the random elements. Preferably, fewer than 10%, particularly fewer than 5%, particularly fewer than 2% of the output data elements are replaced by random elements. It is thus possible to modify some of the output data elements from the biometric output data record which identifies the object without disturbing the explicit association between object and biometric output data record. The artificial neural network can continue to determine the correct final state when the biometric output data record or highly similar data records is/are input again. The modified output data elements can be used to encode a key which can be extracted when the final state is reached. Hence, the key is released as soon as the final state has been reached. The insertion of the random elements ensures that the biometric data obtained and the key differ sufficiently and that there is no direct correlation. In order to extract the key, the trained associative memory is thus absolutely necessary.

The apparatus may comprise a pseudo data record generator device for producing a multiplicity of pseudo data records, wherein the training device uses the pseudo data records and the training data record to train the artificial neural network such that the latter reaches the final state associated with the training data record only when the biometric output data record or a slightly varied data record is input. The bidirectional associative memory is thus trained such that it comprises an exponential number—as regards the number of output data elements—of final states which each correspond to an energy minimum.

The final state associated with the training data record is reached only when the biometric output data record or a data record that is slightly modified therefrom is input into the appropriately trained bidirectional associative memory. In so far as the input is thus not the biometric output data record or a highly similar data record, the bidirectional associative memory will adopt a state which essentially differs from the state or final state associated with the training data record. This final state may correspond to one of the pseudo data records, for example. In this case, the key for authenticating the object cannot be derived, which means that an object without authorization has no way of accessing this key. The pseudo data records can either be randomly generated in a suitable manner or can be derived from anonymized genuine biometric data.

The training device, when training the neural network, particularly the Hopfield network, can take account of the precise number of pseudo data records necessary for the following inequality to be satisfied for a loading factor $\alpha$ for the neural network:

$$0.051 < \alpha < 0.138$$

The loading factor $\alpha$ of a bidirectional associative memory or of a Hopfield network is usually calculated as follows:

Loading factor $\alpha$=number of stored recollections divided by the bit length of the recollections. In the present case, the pseudo data records and the training data record create the stored recollections, these each having a suitable bit length for encoding biometric characteristics. In so far as a value less than 0.051 is chosen for the loading factor $\alpha$, the system is in a ferromagnetic phase, in which global energy minima exist for each of the stored recollections. The latter differ from the input recollections only slightly. Mixing the patterns results in false energy minima. However, these are destabilized upon suitable setting of the system or by a suitable search algorithm (sufficiently high temperature), which means that it is possible to search efficiently for all stored recollections using suitable heuristics.

At a value $\alpha$ greater than 0.138, the system is in a spin glass phase, in which the associative capability of said system is lost on account of uncontrolled proliferation by false recollections.

If the loading factor $\alpha$ is in the indicated range between 0.051 and 0.138, the system adopts a mixed state between spin glass phase and ferromagnetic phase. There are a multiplicity of minima which essentially overlap the original recollections, these being in a metastable state. The true basic state of the system is a spin glass with an exponentially growing number of minima on account of the mixing of the original recollections. The spin glass phase is orthogonal with respect to all stored recollections. When an input into the Hopfield network is sufficiently close (Hamming interval) to the original recollections, the system will converge to a metastable state, so that recapitulation of the recollection is possible. If the input should differ significantly from the stored recollections, however, then the system will end in a state which differs significantly from the stored recollections. In the state determined by the inequality, the network can thus still be used efficiently as an associative memory, it being a NP difficult problem to ascertain all of the energy minima. The network is thus very well suited to being used for authentication, particularly key binding.

The stated object is furthermore achieved by a method for producing an identification device for an object, wherein the method comprises the following steps:

capture of at least one biometric output data record having a number of output data elements for the object;

generation of a number of random elements;

combination of the output data elements with random elements in order to produce at least one training data record;

training of a bidirectional associative memory, as a result of which the latter outputs the training data record at least when the at least one biometric output data record is input;

storage of configuration data which describe the trained bidirectional associative memory.

Further advantageous embodiments can be found in the subclaims.

DETAILED DESCRIPTION OF THE INVENTION

Figure 1:
FIG. 1 shows a grid graphic for a fingerprint.

An essential concept of the present invention is the use of biometric data for authenticating an object, particularly a person, using a key. Both for the purpose of producing a suitable identification device (cf. FIG. 6) and for the purpose of authenticating the person, it is necessary to obtain suitable biometric data for this. In the exemplary embodiment which follows, a method is described in which characteristic data are obtained by using a fingerprint scanner 40 (cf. FIG. 3). The fingerprint scanner 40 captures the surface structure of a finger of the person and generates a grid graphic therefrom. A corresponding fingerprint image 10 is shown in FIG. 1. According to the invention, this fingerprint image 10 is divided into a multiplicity of sectors 11 to 14. In the exemplary embodiment described, only four sectors 11 to 14 are considered, for the sake of simplicity. It is customary to have 256 sectors (n=256) for graphics with 300×400 pixels. The fingerprint image 10 is then divided vertically and horizontally into 16 sectors 11 to 14 in practice, so that each sector contains approximately 19×25 pixels. This division is particularly advantageous in order to compensate for local variations when the fingerprint image 10 is obtained. When the fingerprint image 10 has been split into sectors 11 to 14, each sector is determined to contain (value=1) or not to contain (value=−1) a particular characteristic feature. When fingerprints are analyzed, the form of minutiae is used as such characteristic features. In the exemplary embodiment shown in FIG. 1, a V-shaped ramification of the friction ridge is used as the characteristic feature or distinguishing feature 20, 20'. This distinguishing feature 20, 20' is present in the third sector 13 and in the fourth sector 14. It would thus be possible to derive a biometric output data record BD having the values $\{-1, -1, 1, 1\}$, wherein the biometric output data record BD has the output data record length n=4.

Production of the Identification Device

Figure 6:
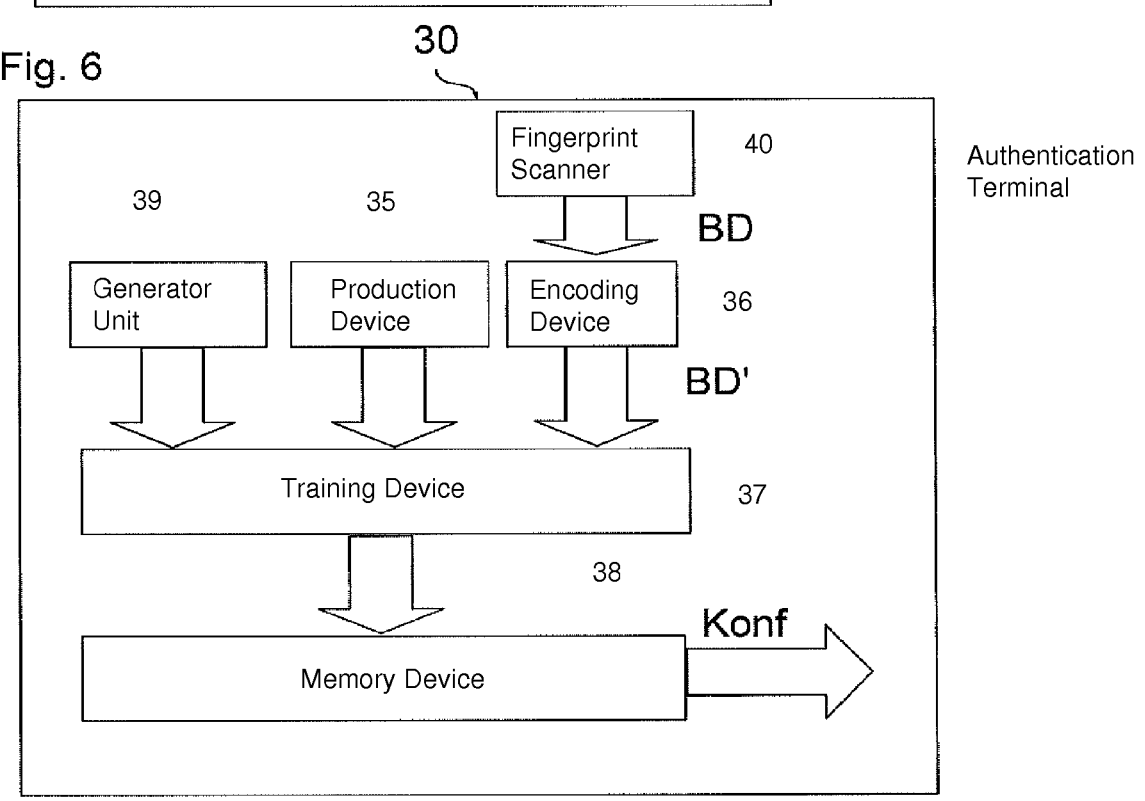
FIG. 6 shows a method for producing an identification device.

FIG. 6 is now used to describe how an identification device for authenticating the person can be obtained from such a biometric output data record BD. As already explained in more detail, the fingerprint scanner 40 produces the biometric output data record BD and inputs it into an encoding device 36. The encoding device 36 generates a key Key which is intended to be used to explicitly identify the person for which the biometric output data record BD has been captured. It is known how such a key Key can be used to control the access authorization of a person, for example for a building. This key Key comprises a number of random elements k which is substantially lower than the output data record length n of the biometric output data record BD. Since the biometric output data record BD is permitted to be corrupted only slightly in order to ensure sufficiently secure recognition in a later authentication method, k can be chosen such that $$\frac{k}{n} < \frac{1}{10}.$$

Figure 2:
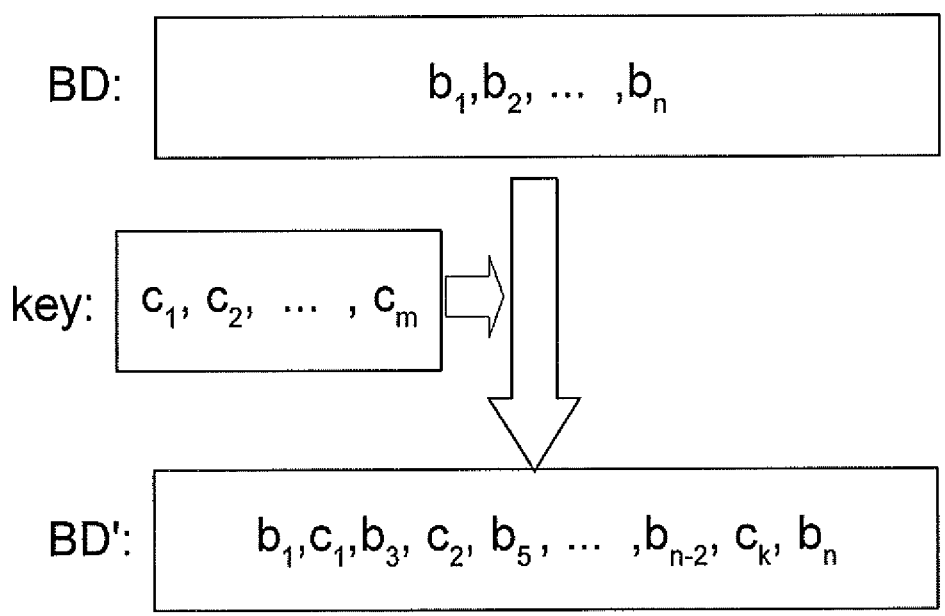
FIG. 2 shows the obtainment of a training data record, particularly a key, from a biometric output data record and random data.

The individual random elements $c_1$ to $c_k$ are likewise binary values from the set of values (−1; 1), with the individual values preferably being determined randomly. The encoding device 36 combines the output data elements $b_1$ to $b_n$ with the random elements $c_1$ to $c_k$ such that a training data record BD' of length n is obtained. As shown in FIG. 2, individual output data elements $b_1$ to $b_n$ are replaced by the random elements $c_1$ to $c_k$. This replacement can be made on the basis of a prescribed scheme. By way of example, every tenth output data element $b_1$ to $b_n$ can be replaced by a random element $c_1$ to $c_k$. The training data record BD' is thus largely composed of the output data elements $b_1$ to $b_n$, with all of the random elements $c_1$ to $c_k$ being included. The training data record BD' thus still has a very high level of similarity (e.g. Hamming interval<n/10) to the biometric output data record BD. The training data record BD' is forwarded from the encoding device 36 to a training device 37. The latter furthermore receives an untrained neural network, namely a Hopfield network, from a production device 35. The Hopfield network has n neurons, the respective associated value for an i-th neuron in the t-th iteration cycle being denoted by $s_i(t)$. In the Hopfield network, the synaptic weights $w_{i,j}$ are symmetrical, i.e. $w_{i,j}=w_{j,i}$ is true for all i and j, each of the binary neurons being connected to every one apart from itself.

Furthermore, the system has a pseudo data record generator device 39 which produces a multiplicity of pseudo data records having a length which corresponds to the output data record length n. The pseudo data record generator device 39 produces as many pseudo data records as are necessary for the training device 37 to be able to be trained for a loading factor $\alpha \approx 0.1$. The loading factor α is obtained from the ratio of the number of stored recollections to the bit length of the recollections (in the present case, it holds that $\alpha=(x+1)/n$, where x indicates the number of generated pseudo data records that are taken into account). The Hopfield network is thus trained using x pseudo data records and a training data record BD', the individual data records being recollections of length n. According to the invention, the following should hold for the loading factor α:

$$0.051 < \alpha < 0.138.$$

If an output data record length of n=256 is assumed, 25 pseudo data records should be produced by the generator unit 39 and taken into account by the training device 37.

The training device 37 now trains the Hopfield network such that the latter recognizes the pseudo data records and also the training data record BD'. That is to say that when the Hopfield network has been trained, input of the training data record BD' or an essentially similar input results in a state from which it is possible to derive the training data record BD'. Similarly, input of one of the pseudo data records or of an essentially similar input results in a state for the Hopfield network from which it is possible to derive the pseudo data record. The training can be effected by applying Hebb's rule. For each synaptic weight $w_{i,j}$, the following formula can be applied:

$$w_{i,j}=1/n\Sigma_{\mu=1\ldots p}\sigma_i^\mu\sigma_j^\mu,$$

where p indicates the total number of recollections to be stored (in the case described above, it would be the case that p=x+1). The vector $\sigma_i^\mu$ indicates the recollections. By way of example, $\sigma_i^1$ could correspond to the training data record BD', where the individual binary output data elements $b_1$ to $b_n$ denotes the state of the neurons "does not fire" (−1) and "fires" (1).

The trained Hopfield network is transferred to the memory device 38 and is mapped thereby onto appropriate configuration data Konf. The configuration data Konf can be stored on the identification device, for example on a chip card. The configuration data describe the individually trained Hopfield network with such precision that it can be reconstructed at any time by using said data. By way of example, the configuration data may contain the individual ascertained synaptic weights $w_{i,j}$. The identification device provided with the configuration data Konf can be used to efficiently authenticate the person from whom the biometric output data record BD was obtained and to ascertain the key.

Figure 5:
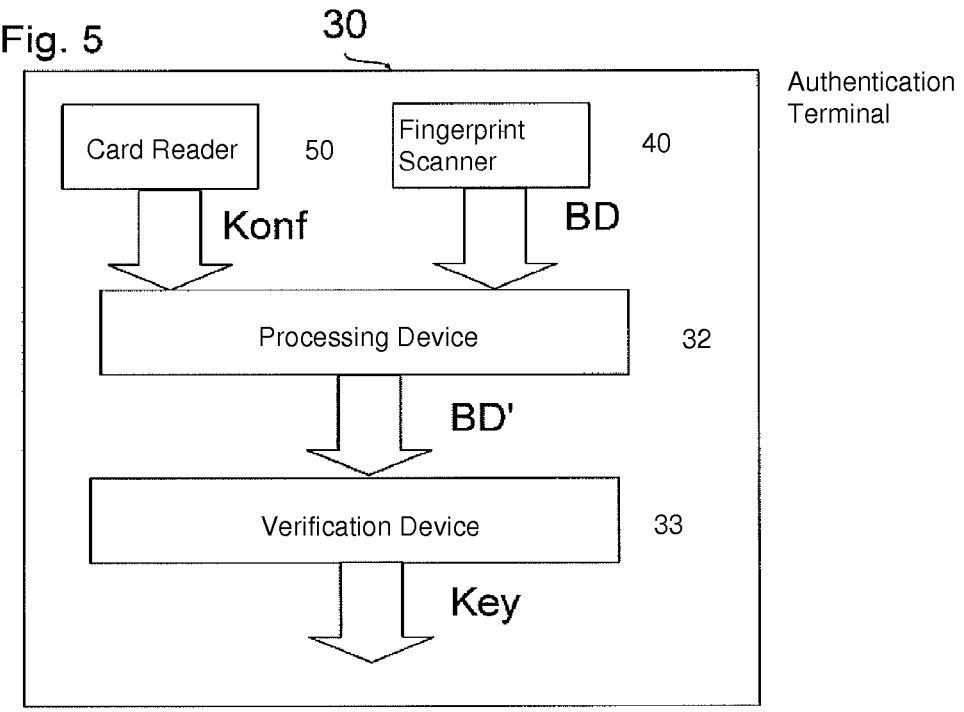
FIG. 5 shows a method for authenticating an object.

Authentication Procedure:

This authentication procedure is described in more detail below with reference to FIG. 5. Thus, a card reader 50 for identifying the person can read in the individual configuration data Konf stored on the chip card and can forward them to a processing device 32. Furthermore, the fingerprint scanner 40 can capture a further fingerprint image 10 of the person and can obtain biometric output data BD therefrom, as already described. These biometric output data may differ slightly from the biometric output data BD which were used to generate the identification device. Subsequently, the biometric output data obtained for the authentication procedure are denoted as BD* or captured biometric output data BD*. The proposed authentication method is of such robustness that such variations—so long as they are within a prescribed framework—have no influence on the result of the authentication process. Furthermore, it is possible to take measures in order to compensate for the variations (cf. dynamic orientation).

The processing device 32 instantiates the individual Hopfield network by using the configuration data Konf and inputs the captured biometric output data BD* into this artificial neural network. The input can be made such that in an initial state the neuron values $s_i(t)$ are equated to the output data elements $b_1$ to $b_n$. It holds for all $i(1 \leq i \leq n)$ that $s_i(0)=b_i$. This input can be used for the Hopfield network to recapitulate the associated recollection, namely the training data record BD'. Generally, it is customary to apply the following energy function for assessing the energy in a network state of the Hopfield network:

$$E = -\frac{1}{2} \Sigma_{i \neq j} w_{i,j} s_i(t) s_j(t)$$

The final state of the Hopfield network is found by minimizing the energy in the system. Hence, the association of an input into the Hopfield network with a particular recollection (e.g. the training data record BD') is iterative optimization of the energy states. Preferably, the processing device 32 makes asynchronous changes to the neurons in an iterative process, with a respective neuron being randomly selected and the next neuron value $s_i(t+1)$ of said neuron being calculated as follows:

$$s_i(t+1) = \begin{cases} +1 & \text{if } \sum_{i \neq j} w_{i,j} s_j(t) > 0 \\ -1 & \text{else} \end{cases}$$

For the asynchronous change, an already updated neuron is preferably taken into account again only if all of the other neurons have already been updated. That is to say that the set from which the neuron to be updated is randomly selected decreases in each iteration step until all neurons have been considered. All neurons are then taken into account again and processed in a random order. The associated local energy minimum can thus be ascertained quickly. The Hopfield network adopts a stable state in which the individual neurons no longer change. A verification device 33 can use this final state to derive the training data record BD' and, therefrom, the key Key, or the key Key directly. The key identifies the user and can be used in order to allocate particular authorizations to him.

In so far as the input or captured biometric output data record BD* does not have sufficient similarity to the training data record BD' (e.g. on account of poor capture of the fingerprint image 10 or on account of an attempt at deception), the Hopfield network adopts a final state which does not correspond to the training data record BD'. It could be said that the Hopfield network does not recall the relevant person or associates the input with a false recollection (e.g. a pseudo data record).

Figure 7:
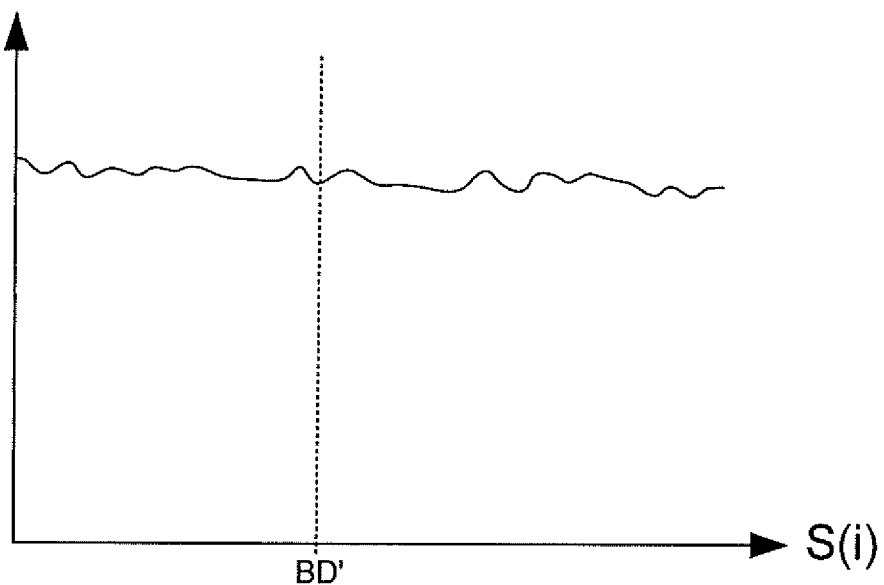
FIG. 7 shows the energy distribution in a Hopfield network configured according to the invention.

The advantage of the proposed Hopfield network is that it behaves in a similar fashion to a spin glass and has a pronounced level of frustration. By way of example, FIG. 7 shows the energy function for a Hopfield network trained according to the invention over all of the states which this network can adopt. This energy function shows that the network has a multiplicity of local minima which can be calculated only with exponential complexity using a deterministic approach. This means that the proposed Hopfield network can be decrypted only with great difficulty.

Figure 3:
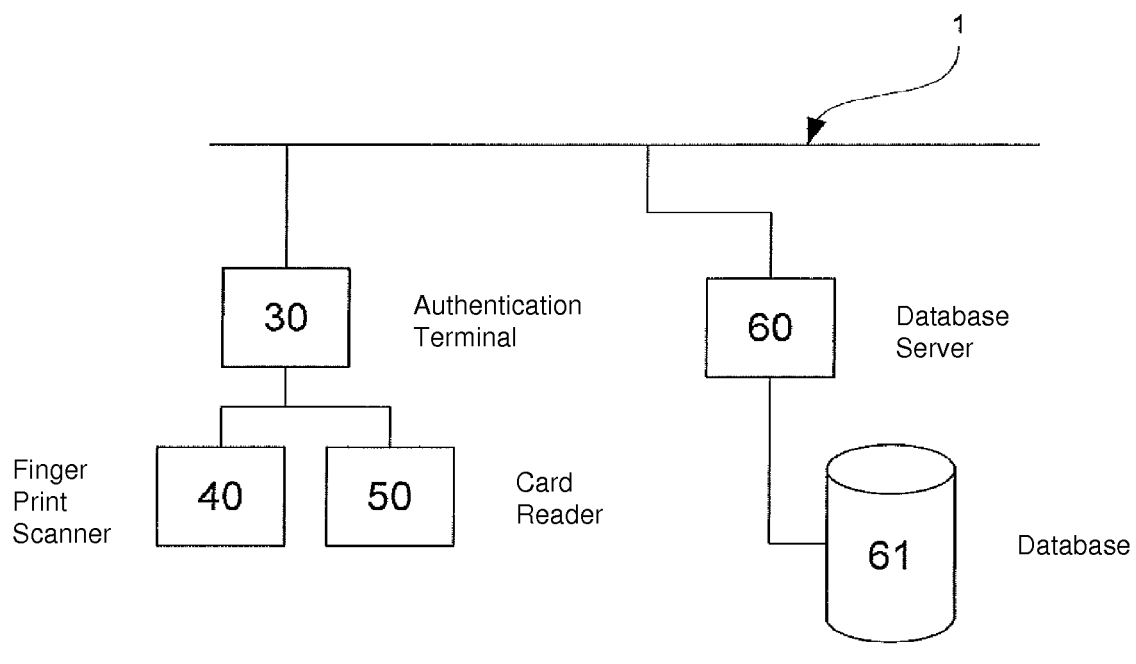
FIG. 3 shows an authentication system with an authentication terminal and a database server.
Figure 4:
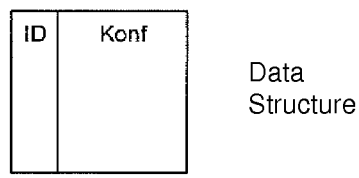
FIG. 4 shows an exemplary table structure for the database server from FIG. 3.

FIG. 3 shows a possible design for an authentication system according to the invention. This system is essentially composed of two components, namely a database server 60 and an authentication terminal 30. The steps described above for producing an identification device and for authenticating a person can all be accomplished by the authentication terminal 30. On the other hand, it is conceivable for the configuration data Konf not to be stored on a portable identification device, but rather for them to be stored in a database 61 in a database server 60. Communication between the authentication terminal 30 and the database server 60 can be set up via a network. In this exemplary embodiment, the person to be authenticated merely has an identification number ID. He can input this by using a keypad connected to the authentication terminal 30, for example. Using this identification number ID, the authentication terminal 30 reads the associated configuration data Konf from the database 61. FIG. 4 schematically shows the data structure 62 used in the database 61.

Dynamic Orientation

It is possible to reduce the probability of the occurrence of falsely negative results for the authentication procedure by effecting automatic orientation of the fingerprint image 10 obtained in the authentication procedure in relation to the fingerprint image 10 used for generating the identification device. Hence, an essentially similar or highly similar biometric output data record BD is obtained for the Hopfield network when the "correct" fingerprint has been captured. The biometric output data record BD* obtained or captured in the authentication procedure is intended to be oriented in relation to the output data record BD used for generating the identification device. In relation to the preceding exemplary embodiment, which was explained using a fingerprint image 10, such orientation is essentially a permutation σ(BD*) of the captured biometric output data record BD*. Dynamic orientation is necessary inter alia, since translations and rotations arise when the fingerprint image 10 is obtained. Only rarely is it possible to obtain, at a later time, a fingerprint image 10 which exactly matches the one which was used to generate the identification device. According to the invention, the trained artificial neural network which has configuration data stored on the identification device can advantageously be used to dynamically orientate the obtained or captured biometric output data record BD*. The Hopfield network is thus used for authentication and for preprocessing, namely for orientation, of the fingerprint image 10. A correction device preferably implements the dynamic orientation procedure.

During the dynamic orientation of the captured biometric output data record BD*, the aim is thus to find an optimum permutation σ*(BD*) for the captured biometric output data record BD*. This is done by instantiating the artificial neural network, selecting an initial permutation, e.g. σ⁰(BD*), and inputting the first permutated output data record BD⁰ into the neural network. The permutation $\sigma^d(BD^*)$ is defined by a translation a(d) and a rotation φ(d) of the fingerprint image 10, each of which are indicated by an index value d. In the first iteration step of a macrocycle, d=0. The first permutated output data record BD⁰ can be determined by a random choice of a translation a(d=0) and a rotation φ(d=0).

In an iterative microcycle, in a similar manner to that which has already been described, a thermalized (e.g. with a low level of fluctuation in comparison with a Bolzmann distribution) state of the network is then determined. Preferably, the processing device 32 makes asynchronous changes to the neurons in the microcycle, each iteration step involving a neuron being randomly selected and the next neuron value $s_i(t+1)$ of said neuron being calculated as follows:

$$s_i(t+1) = \begin{cases} +s_i(t) & \text{with } p = \frac{\exp(\beta h_i(t)s_i(t))}{2\cosh(\beta h_i(t)s_i(t))} \\ -s_i(t) & \text{with } \bar{p} = \frac{\exp(-\beta h_i(t)s_i(t))}{2\cosh(\beta h_i(t)s_i(t))} \end{cases}$$

where $$h_i(t) = \Sigma_{i \neq j} w_{i,j} s_j(t) + \theta_j$$

where p and $\bar{p}$ are probabilities.

The temperature parameter β of the neural network (the temperature T of the network has the following relationship with the temperature parameter β: β=1/T) is determined for the microcycle, following the selection of the first permuted output data record $BD^0$, such that the following inequality is satisfied:

$$1 > \frac{1}{\beta} > T_C \text{ where } \frac{T_C}{\tanh^2(h_0/T_C)} = 1 \text{ and } \frac{1}{N} < h_0 < 1.$$

The threshold value $\theta_i$ is also geared to the selection of the permutated output data record $BD^0$: $\theta_i = h_0 s_j(d=0)$.

Thus, whether the neuron value $s_i(t+1)$ is altered is dependent on the probability p, which is ascertained as shown above.

In order to determine a termination point for a microcycle, the following customized energy function can be considered:

$$E(d,t) = -\frac{1}{2}\Sigma_{r=r'} w_{r,r'} s(r,t)s(r',t) - \Sigma_r h_0 s([\phi(d)r] + a(d), 0)s_{(r,t)}$$

For the sake of simplicity, the neuron values for the customized energy function are presented as s(r,t), where r is a two-dimensional local vector which denotes a neuron and hence the presence of a feature in a segment of the two-dimensional output image. The following mapping has thus been performed: $s_i \to s(r,t)$. For the example shown in FIG. 1, the following values are thus obtained: s((0,0),0)=1, s((0,1),0)=1, s((1,0),0)=1 and s((1,1),0)=−1.

The square brackets "[ . . . ]" in the customized energy function E(d,t) can be regarded as a rounding function which ensures that discrete local vectors are always delivered.

Following a multiplicity of iteration steps in the microcycle, the system forgets its initial state and adopts a Boltzmann distribution, in which a particular configuration of the neural network occurs with a probability of $e^{-\beta E}$. The iteration steps of the microcycle need to be repeated often enough for a Boltzmann distribution or a corresponding stable state to become established. This state can be found by using known techniques, e.g. a Monte Carlo algorithm.

Following the conclusion of a microcycle, the final state is used to determine a new permutated output data record $BD^d$, which is in turn defined by a translation a(d) and a rotation φ(d). The ascertainment of the new permutated biometric output data record $BD^d$ is an optimization problem and can be ascertained by using the gradient method or the steepest descent method, for example. Thus, in the d-th iteration step of the macrocycle, the translation a(d) and the rotation φ(d) are chosen such the following equations are satisfied:

$$\phi(d) - \phi(d-1) = -\lambda_\phi \partial E/\delta\phi + \gamma(d-1)$$

$$a(d) - a(d-1) = -\lambda_a \delta E/\delta a + \eta(d-1)$$

where $\lambda_a$ and $\lambda_\phi$ indicate the respective step sizes and γ(d−1) and γ(d−1) indicate possible temperature noise. The iteration steps of the macrocycle converge in an optimum permutation σ*(BD*). This optimum permutation can be used in order to carry out the authentication procedure described. It is therefore possible to ensure that the authentication is successful irrespective of the orientation of the finger and essentially irrespective of possible translations and/or rotations.

It can easily be appreciated that the orientation method described is particularly suited to orientation of the output data record BD* generated and captured from minutiae using the cited method. However, it is obvious for this orientation method to be applied to mapping operations for other characteristic identifiers, e.g. in the case of an iris scan. The method is not limited to the imaging domain only, however, and can be used not only for compensating for translations and rotations. In theory, the method described can be applied to any feature obtainment method in which characteristic discrepancies arise in the course of mapping onto biometric output data records BD. If a DNA sequence is used in order to authenticate a person, for example, it is conceivable that the method for determining the sequence has a high probability of confusing two particular amino acids. It should be a simple possibility for a person skilled in the art who is working in this field to modify the dynamic orientation method described such that authentication can be performed even when the particular DNA sequence contains numerous instances of confusion.

In the preceding exemplary embodiment, the invention is described predominantly with reference to a Hopfield network which contains the key for biometric authentication of a person. It should be apparent to a person skilled in the art working in this field that the principle outlined can also be applied to all associative memories. The encoding of the key Key in the network also gives rise to numerous variations which are apparent to a person skilled in the art working in this field.

The cited random elements $c_1$–$c_k$ may be any elements. By way of example, it would also be possible to use these elements to encode a particular piece of information.

The dynamic orientation of the image which is implemented by the correction device can also be used for any authentication device or any authentication method, which does not necessarily access an artificial neural network.

In a further exemplary embodiment, the key Key is used to produce a hash function. It is possible to store this hash function in a central database in order to allow authentication of an object. By way of example, a mobile telephone which is designed to capture a biometric fingerprint may store a program which allows the protected handling of a transaction. By way of example, the mobile telephone displays an identification number ID for handling the transaction on a payment terminal, said identification number then being input into the terminal and being transmitted to the central database. Furthermore, the terminal transmits a customer number which is associated with the terminal. So as now to authorize the transaction, the central database uses the identification number ID to determine the telephone number of the mobile telephone and the hash function associated with the user thereof. The central database transmits a randomly generated number to the mobile telephone. The mobile telephone asks the user to have his fingerprint read in, reads the configuration data Konf from its memory and uses the method described to generate the key Key.

The mobile telephone can then generate the hash function from the key Key and can input the random number transmitted by the central database into said hash function, and calculates the hash value for the combination of the random number and the hash value of the key. The result of the random number mapped by the hash function is uploaded to the central database and authorizes the transaction.

The invention claimed is:

1. An apparatus for producing an identification device, comprising:
    a capture device for capturing at least one biometric output data record (BD) having a number (n) of output data elements ($b_1$-$b_n$) for an object;
    a random element generator device for producing a number k of random elements ($c_1$-$c_k$),
    a production device for producing an artificial neural network, namely a bidirectional associative memory;
    an encoding device for combining the output data elements ($b_1$-$b_n$) with random elements ($c_1$-$c_k$) in order to produce at least one training data record (BD');
    a training device which trains the bidirectional associative memory, such that the latter outputs the training data record (BD') at least when the at least one biometric output data record (BD) is input; and
    a memory device for storing configuration data (Konf) which describe the trained bidirectional associative memory.

2. The apparatus as claimed in claim 1, wherein
the production device chooses the artificial neural network such, and the training device trains the artificial neural network such, that the artificial neural network outputs a key (Key), particularly the training data record (BD'), for the purpose of authenticating the object when recognizing the biometric output data record (BD).

3. The apparatus as claimed in claim 1, wherein
the number (k) of random elements ($c_1$-$c_k$) is smaller than the number (n) of output data elements ($b_1$-$b_n$), wherein the encoding device produces the training data record (BD') by replacing a portion of the biometric output data record (BD) with the random elements ($c_1$-$c_k$).

4. The apparatus as claimed in claim 1, wherein
a pseudo data record generator device for producing a multiplicity of pseudo data records, wherein the training device uses the pseudo data records and the training data record (BD') to train the bidirectional associative memory such that the latter reaches the final state associated with the training data record (BD') only when the biometric output data record or a slightly varied data record is input.

5. The apparatus as claimed in claim 1, wherein
the training device, when training the bidirectional associative memory, takes account of the precise number of pseudo data records necessary for the following inequality to be satisfied for a loading factor ($\alpha$) for the bidirectional associative memory:

$$0.051 < \alpha < 0.138.$$

6. A method for producing an identification device for an object, comprising the steps of:
    capture of at least one biometric output data record (BD) having a number (n) of output data elements ($b_1$-$b_n$) for the object;
    generation of a number (k) of random elements ($c_1$-$c_k$);
    combination of the output data elements ($b_1$-$b_n$) with random elements ($c_1$-$c_k$) in order to produce at least one training data record (BD');
    training of a bidirectional associative memory, as a result of which the latter outputs the training data record (BD') at least when the at least one biometric output data record (BD) is input; and
    storage of configuration data (Konf) which describe the trained bidirectional associative memory.

7. The method as claimed in claim 6, wherein
generation or reading of a multiplicity of pseudo data records, wherein the bidirectional associative memory is trained such that the bidirectional associative memory outputs one of the pseudo data records at least when a data record with little similarity to the biometric output data record (BD) is input.

8. The method as claimed in claim 6, wherein
the training of the bidirectional associative memory takes account of the precise number of pseudo data records necessary for the following inequality to be satisfied for a loading factor (a) for the neural network:

$$0.051 < \alpha < 0.138.$$

* * * * *